(12) United States Patent  
Yamazaki et al.

(10) Patent No.: US 7,582,236 B2
(45) Date of Patent: Sep. 1, 2009

(54) FILM STRETCHING APPARATUS AND SOLUTION FILM-FORMING METHOD

(75) Inventors: Hidekazu Yamazaki, Kanagawa (JP); Sadanobu Fujimoto, Kanagawa (JP); Toshinao Arai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 792 days.

(21) Appl. No.: 10/950,818

(22) Filed: Sep. 28, 2004

(65) Prior Publication Data

US 2005/0073071 A1    Apr. 7, 2005

(30) Foreign Application Priority Data

Oct. 1, 2003    (JP)    ............... 2003-343635

(51) Int. Cl.
*B29D 7/01*    (2006.01)
(52) U.S. Cl. .................... 264/1.34; 264/288.4; 264/291
(58) Field of Classification Search ................. 264/175, 264/212, 216, 298, 1.33, 1.34, 1.35, 288.4, 264/291; 425/325
See application file for complete search history.

(56) References Cited

U.S. PATENT DOCUMENTS 5,771,547 A * 6/1998 Hommes et al. ............... 26/93
7,037,461 B1 * 5/2006 Denker et al. ............... 264/519
2003/0224113 A1 * 12/2003 Nakamura et al. ........ 427/372.2
2008/0192191 A1 * 8/2008 Nakamura et al. .......... 349/117

FOREIGN PATENT DOCUMENTS

JP    62-115035 A    5/1987
JP    2002-337224 A    11/2002

* cited by examiner

*Primary Examiner*—Steven P Griffin
*Assistant Examiner*—Russell J Kemmerle, III
(74) *Attorney, Agent, or Firm*—Sughrue Mion, PLLC

(57) ABSTRACT

A clip to hold the film has a clip body, a flapper, a press slider and a rail mount. A pair of the press sliders is located in both sides of the flapper. A coil spring presses the press slider upward. A pair of entrance side film release members, provided in the tenter entrance, presses the press slider downward to press the lateral edge portions of the film by the press sliders. At the film hold position, the flapper rotates from a release position to a hold position to hold the film, and the flapper is kept at the hold position by a torsion spring. The flapper holds the film 26 after the press slider holds the lateral edge portions of the film, so the flapper can hold the film even when the lateral edge portions of the film are curled.

11 Claims, 18 Drawing Sheets

FILM STRETCHING APPARATUS AND SOLUTION FILM-FORMING METHOD

BACKGROUND OF THE INVENTION

1. Field of the Invention

The present invention relates to a film stretching apparatus and a solution film-forming method that is preferably used for manufacturing polymer films for optical purposes such as liquid crystal devices, organic electro luminescence and polarizing plates.

2. Description of the Related Art

Polymer films for use in optical purposes are generally manufactured by a solution film-forming method including the steps of casting a polymer liquid (dope) on a support from a casting die, peeling the solidified dope (polymer film) from the support, drying the film and winding the solidified film.

In order to improve the flatness, mechanical strength and optical properties of the polymer film, Japanese Patent Laid-Open No. 62-115035 describes a tenter apparatus to stretch the polymer film and regulate the width of the polymer film. Such tenter apparatus is provided in the drying step, so the polymer film is stretched between the peeling step and the drying step.

The tenter apparatus is provided with plural clips to hold the lateral edge portions of the polymer film. Each of the clips, fixed to an endless chain at regular intervals, comprises a U-shaped clip body and a swingable flapper attached to the upper portion of the clip body. The flapper is normally held by its weight at a close position in which the polymer film is held between the lower portion of the clip body and the lower end of the flapper. When the upper portion of the flapper is engaged with a clip opener, the flapper rotates upward so that the flapper is held at an release position to allow the lateral edge portions of the polymer film to enter the clip. Then, the upper portion of the flapper is disengaged from the clip opener so that the flapper rotates by its weight from the release position to the close position. Thereby, the lateral edge portions of the polymer film are held by the clip.

Due to the increase in demand for the optical polymer film and the requirement of reducing the manufacture cost, it is necessary to increase the productivity of the polymer film by the solution film-forming method. In other words, it is required to increase the film formation speed and the width of the polymer film. In addition, the polymer film is required to be thinner for the purpose of increasing the optical property and providing various optical functions. The solution film-forming method using the above conventional tenter apparatus can not provide polymer films to satisfy such requirements. For instance, since thin and wide polymer film tends to be curly in the widthwise direction, the clip would not be able to hold properly the lateral edge portions of the polymer film, and thereby, the lateral edge portion of the polymer film may be folded by the clips. Moreover, increasing the film-forming speed causes higher volatility of the solvent of the polymer solution at the time when the clips start to hold the polymer film, and thus the clips cannot hold the polymer film properly. Especially, since the polymer film before the drying step becomes softer due to high film-forming speed, the clips may break the lateral edge portion of the polymer film.

To solve the problem of improper clipping, the inventor of the present invention describes, in Japanese Patent Laid-Open No. 2002-337224, the film stretching method including the steps of initially holding the lateral edge portions of the polymer film by pins, and then holding the polymer film by the clips. This method, however, needs to provide both the pins and the clips so that the tenter apparatus will be more complicated. Moreover, even the pins may not be able to hold the polymer film properly if the lateral edge portions of the polymer films are largely curled.

SUMMARY OF THE INVENTION

An object of the present invention is to provide a film stretching apparatus that can properly feed a soft polymer film before the drying step without making a breakage in the lateral edge portions thereof.

Another object of the present invention is to provide a film stretching apparatus in which the clips can hold the polymer film properly even if the lateral edge portions of the polymer film are curled.

Further object of the present invention is to provide a solution film-forming method to form the polymer film by use of such film stretching apparatus.

To achieve the above objects, the film stretching apparatus comprises plural clips attached to a pair of endless members for holding both lateral portions of a polymer film, and the film stretching apparatus stretches the polymer film in the direction that crosses a film feeding direction while driving the endless members to feed the polymer film in the film feeding direction. The clip comprises a first holder for holding the lateral edge portion of the polymer film, and a second holder for holding the lateral portion of the polymer film that is inside of the lateral edge portion.

The first holder holds the lateral edge portion of the polymer film before the second holder holds the lateral portion of the polymer film. Then, the first holder releases the polymer film after the second holder holds the lateral portion of the polymer film.

In a preferred embodiment, the first holder comprises a curl hold member attached to the clip body. The curl hold member is movable between a first release position to allow the lateral edge portion of the polymer film to enter the clip body, and a first hold position in which the curl in the lateral edge portion of the polymer film is held between the curl hold member and the clip body. The second holder comprises a flapper attached to the clip body. The flapper is movable between a second release position to allow the lateral portion of the polymer film to enter the clip body, and a second hold position in which the lateral portion of the polymer film is held between the flapper and the clip body.

The flapper is biased toward the second hold position by a first biasing member. The flapper is engaged with a switch member that moves the flapper to the second release position during the movement of the clip. The curl hold member is kept at the first hold position, and the switch member engages the curl hold member to move the curl hold member to the first release position during the movement of the clip. The switch member may be adjustable in the direction of the movement of the clip.

The clip may have a second biasing member, a first engaging member and a second engaging member. The second biasing member biases the flapper toward the second release position when the flapper is in the side of the second release position. The second biasing member biases the flapper toward the second hold position when the flapper is in the side of the second hold position. The first engaging member engages the flapper to move the flapper from the second release position to the second hold position. The second engaging member that engages the flapper and the curl hold member to move the curl hold member and the flapper to the first and second release positions respectively. The first engaging member may be adjustable in the direction of the movement of the clip.

Such film stretching apparatus may be used in solution film-forming for forming a polymer film by casting polymer solution on a support, peeling the polymer film off from the support, and extending the polymer film by a film extension apparatus, the film stretching apparatus having plural clips attached to a pair of endless members for holding both lateral portions of a polymer film.

The film feeding speed by the endless members is within the range from 1.0 to 1.5 times of the film feeding speed by the support, thereby the polymer film from the support is stretched to the film feeding direction in the area upstream of the film extension apparatus.

The volatile component of the polymer film during extension is 3 wt % to 300 wt %. The width of the polymer film after stretching is 1200 mm to 2000 mm. The polymer film is a cellulose acylate film. An additive to the polymer solution includes at least one of Rth control agent, ultraviolet ray absorbent, plasticizer, hydrophobic agent and matt agent.

The polymer film is a multi-layer film formed from more than one kind of polymer solution, the polymer solutions being cast on the support by co-casting or successive casting. The volatile component of the multi-layer film during extension is 3 wt % to 300 wt %. The multi-layer film is stretched with the temperature profile between 40° C. to 140° C.

According to the present invention, since the first holder holds the lateral edge portion of the polymer film and a second holder the lateral portion of the polymer film that is inside of the lateral edge portion, it is possible to ensure to hold the film without causing failure in holding or breakage in film edge, even if the lateral edge portions are curled. Moreover, since the first holder holds the lateral edge portion of the polymer film before the second holder holds the lateral portion of the polymer film, it is possible to feed the soft polymer film before drying process without causing the breakage in the polymer film. Furthermore, the first biasing member to press the flapper toward the second hold position makes it possible to set the flapper at the second hold position securely and quickly.

BRIEF DESCRIPTION OF THE DRAWINGS

The above objects and advantages of the present invention will become easily understood by one of ordinary skill in the art when the following detailed description would be read in connection with the accompanying drawings, in which.

PREFERRED EMBODIMENTS OF THE INVENTION

[Solvents]

Any known solvents are applicable for preparing a dope. Especially, halogenated hydrocarbons such as methylene chloride (dichloromethane), esters such as methyl acetate, ethers, alcohols (methanol, ethanol, n-butanol, for instance) and ketones (acetone for instance) are preferably used, but not limited to them. A mixture of the above solvents may be used for preparing the dope, and a tenter apparatus may feed the polymer film formed from such mixed dope.

[Polymers]

Although the kind of the polymer is not limited, cellulose acylate is preferably used. More preferably, cellulose triacetate (TAC) having the degree of acetylation of 59.0% to 62.5% is used as the polymer. By use of the TAC film, the optical film, the polarizing plate and the liquid crystal plate exhibit excellent optical properties, stability in size.

[Additives]

Any known additives may be contained in the dope. Examples of the additives are plasticizer (for example, triphenyl phosphate (TPP) and biphenyl diphenyl phosphate (BDP)), ultraviolet ray absorbent (for example, oxybenzophenone compound, benzotriazole compound), matt agent, viscosity agent, oil gel agent (for example, cyclohexane diamine derivative), fluoro surfactants, peeling agent, anti-deterioration agent (such as anti-oxidant, peroxide decomposer, anti-radical agent, metal deactivator, acid capture agent and amine), and Rth control agent. The additives are not limited to those listed above. Rth control agents include Rth rising agents and Rth reducing agents.

These additives may be mixed with the polymer in preparing the dope. A stationary mixer may be used to mix the additives in line while the polymer film is transferred. In the present invention, the solidified portion indicates the polymer and the additives. The details of the additives applicable to the present invention are described in Japanese Patent Application No. 2003-319673, entitled "Cellulose Acylate Film and Solution Film-forming Method", filed on Sep. 11, 2003, and Japanese Patent Application No. 2003-319811, entitled "Cellulose Acylate Film, Solution Film-forming Method and Film Product", filed on Sep. 11, 2003, the details of which are herein incorporated by reference.

[Solution Film-forming Method]

Figure 1:
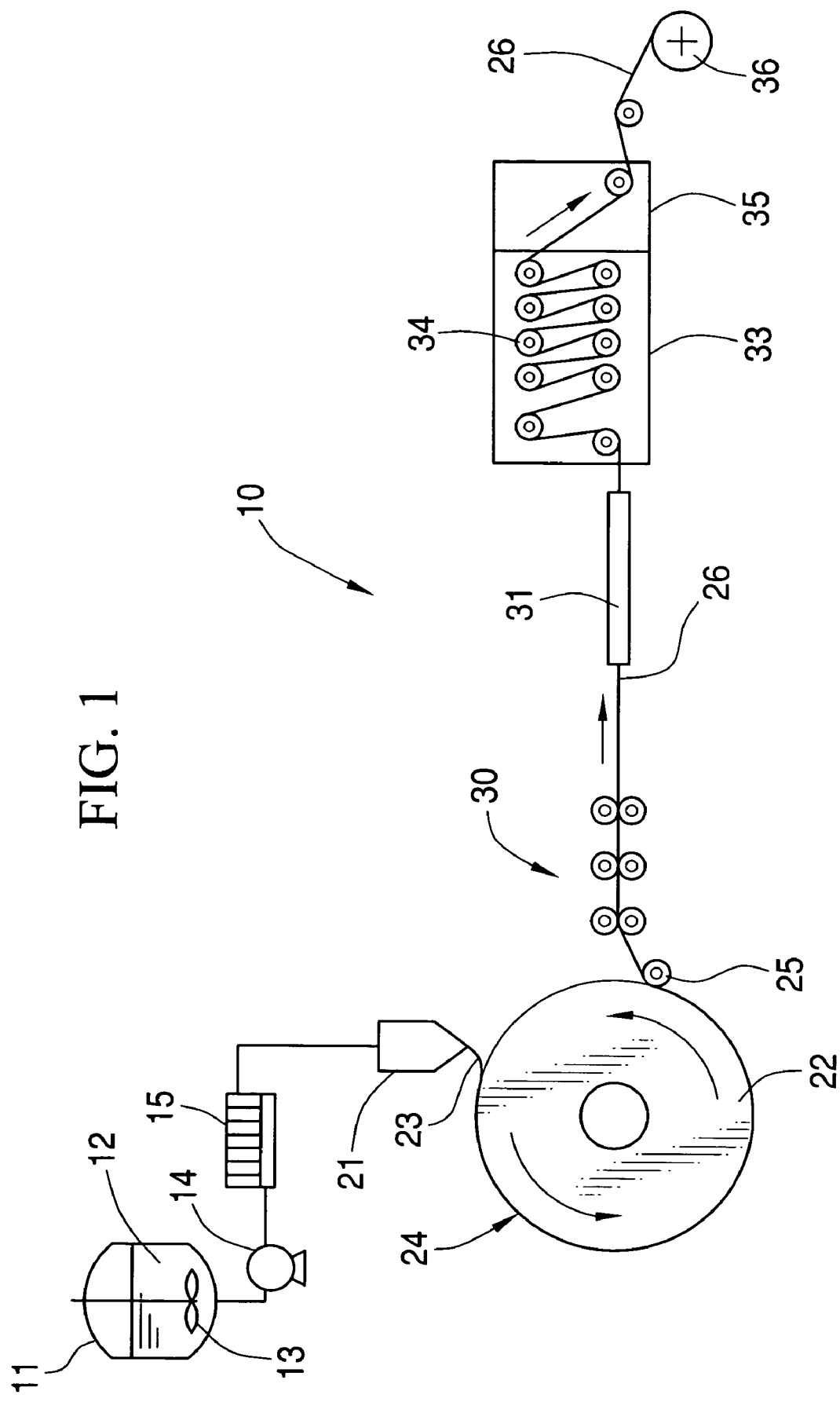
FIG. 1 is a schematic view of a solution film-forming facility that includes a film stretching apparatus according to the present invention.

A solution film-forming facility is depicted in FIG. 1. A dope 12, prepared according to the method described above, in a mixing tank 11 is stirred by a stirrer 13 that is driven by a motor (not illustrated). A pump 14 pumps the dope 12 into a filter device 15 to remove impurities. The dope after filtration is flowed into a casting die 21 at a regular flowing speed. The casting die 21 is located above a rotary drum 22 as an endless support member that is rotated by a non-illustrated driving device. A casting bead 23, formed by casting the dope 12 on the rotary drum 22 from the casting die 21, is gelled to form a gel layer 24 on the rotary drum 22. While the gel layer 24 is rotated by rotating the rotary drum 22, the gel layer 24 is further gelled enough to support its weight. At a peeling position, the gel layer 24 is peeled off from the rotary drum 22 by the peeling roller 25 so that a film 26 is formed. The film 26 is fed to a tenter apparatus 31 through the feeding roller section 30. The tenter apparatus 31 stretches the film 26 in the lengthwise direction (parallel to the feeding direction A1 of the film 26 (see FIG. 2)) while regulating the width of the film 26 and drying the film 26.

The film 26 after the tenter apparatus 31 is fed into a drying chamber 33. While plural feeding rollers 34 in the drying chamber 33 feed the film 26 downwards, the film 26 is dried. Then, the film is cooled to room temperature in a cooling chamber 35. The film 26 after cooling step is wound around a film winding machine 36 to form a rolled film product. The cooling temperature in the cooling chamber 35 is preferably the room temperature (about 25° C.), but not limited to the room temperature. The cooling temperature in the cooling chamber 35 may be 60° C., for example.

[Tenter Apparatus]

Figure 2:
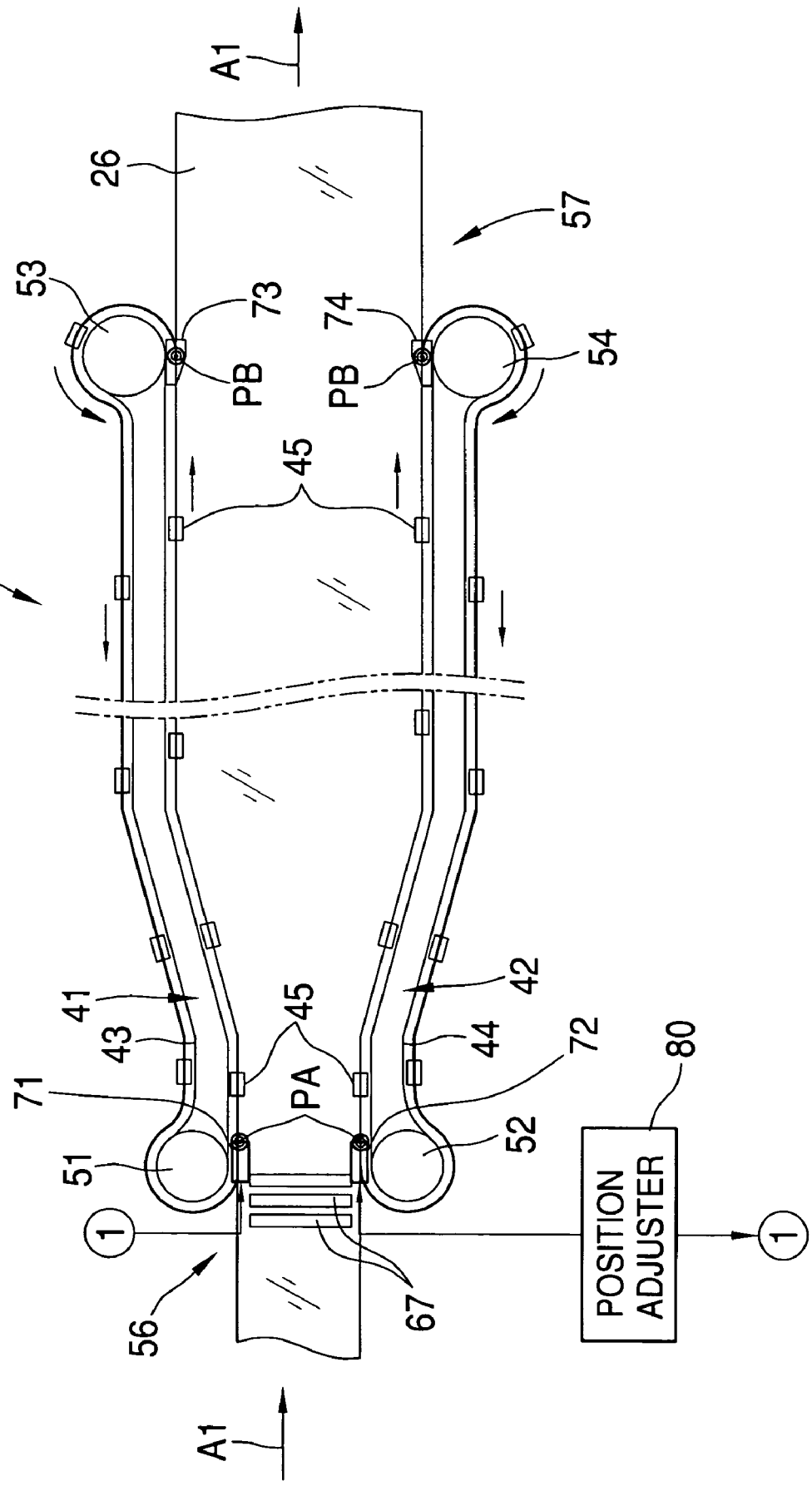
FIG. 2 is a plane view to illustrate a tenter apparatus.

Referring to FIG. 2, the tenter apparatus 31 comprises a left rail 41, a right rail 42 and a pair of endless chains 43, 44 that are respectively guided by the left and right rails 41, 42. Plural clips 45 are fixed to the endless chain 43, 44 at regular pitches. The clip 45 holds the lateral portion of the film 26 and moves along the rail 41, 42 so that the film 26 is stretched in the direction parallel to the film feeding direction A1.

The endless chains 43, 44 are respectively hanged between drive sprockets 51, 52 and driven sprockets 53, 54 so that the endless chain 43 is guided by the left rail 41 and the endless chain 44 is guided by the right rail 42. The drive sprockets 51, 52, provided in the side of a tenter entrance 56, are driven by a drive mechanism (not illustrated). The driven sprockets 53, 54 are provided in the side of a tenter exit 57. In this embodiment, the film 26 is stretched in the widthwise direction by increasing the distance between the rails 41, 42 with respect to the film feeding direction A1, but the shape of the rails 41, 42 and the gap therebetween are not limited to those illustrated in the drawings. For instance, the rails 41, 42 may be parallel to each other. In that case, the film 26 is stretched in the widthwise direction when the film 26 is dried and shrunk in the widthwise direction.

Figure 3:
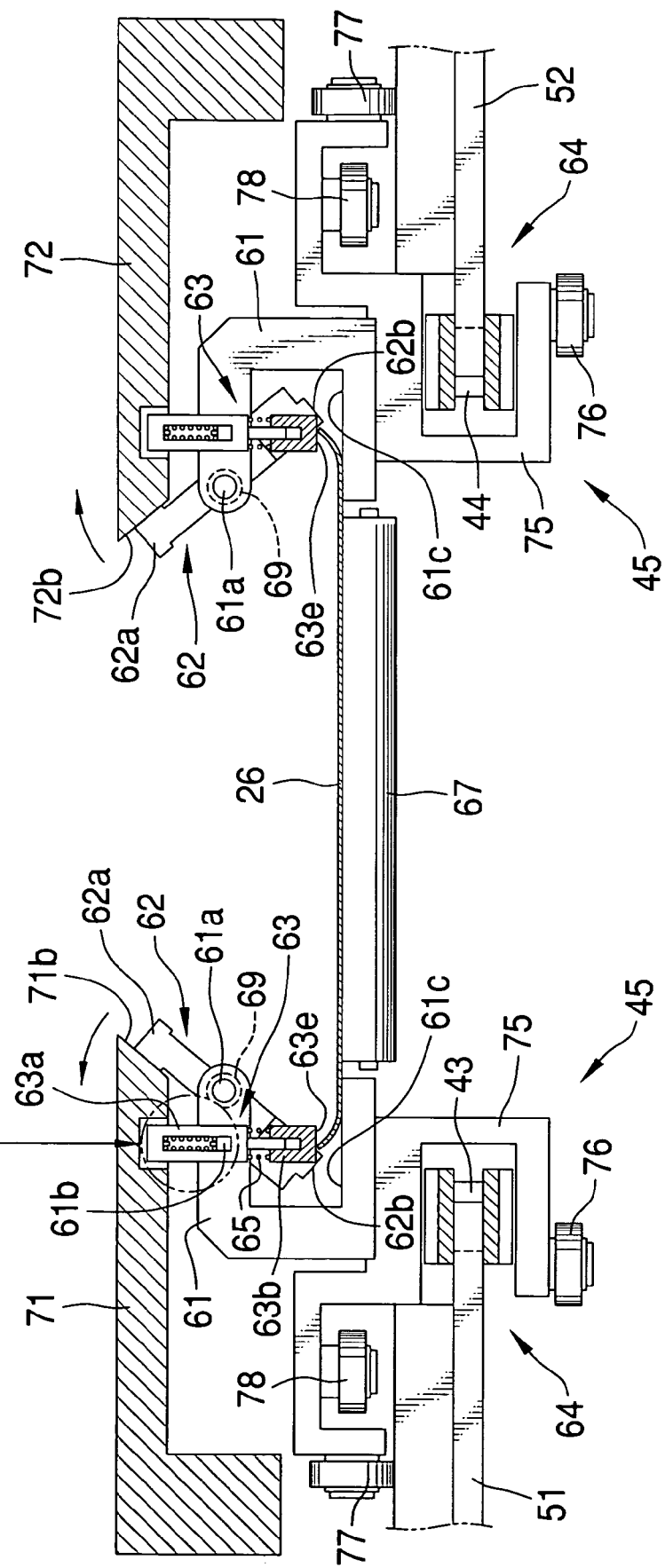
FIG. 3 is a side view of a pair of clips before a holding slider holds the lateral edge of the film.

Referring to FIG. 3, the clip 45 comprises a U-shaped clip body 61, a holding slider 63 as a first holder, a flapper 62 as a second holder, and a rail mount 64. The holding sliders 63 are provided so as to sandwich the flappers 62. The flapper 62, fitted into a shaft 61a of the clip body 61, is rotatable around the shaft 61a. The left chain 43 and the right chain 44 are mounted in the rail mount 64. The holding slider 63 has a slide portion 63a and a holding portion 63b. The slide portion 63a, fitted into the holding portion 63b, is vertically slidable. A coil spring 65 is provided between the slide portion 63a and the holding portion 63b. The upper end of the coil spring 65 is fixed to the slide portion 63a and the lower end thereof is fixed to the holding portion 63b, so the slide portion 63a and the holding portion 63b are not separated from each other. A guide pin 61b of the clip body 61 is fitted into an opening 63c formed in the slide portion 63a, and thereby, the slide portion 63a is vertically slidable to the clip body 61. A coil spring 66, provided in the opening 63c of the slide portion 63a, presses the holding slider 63 upward.

Figure 4:
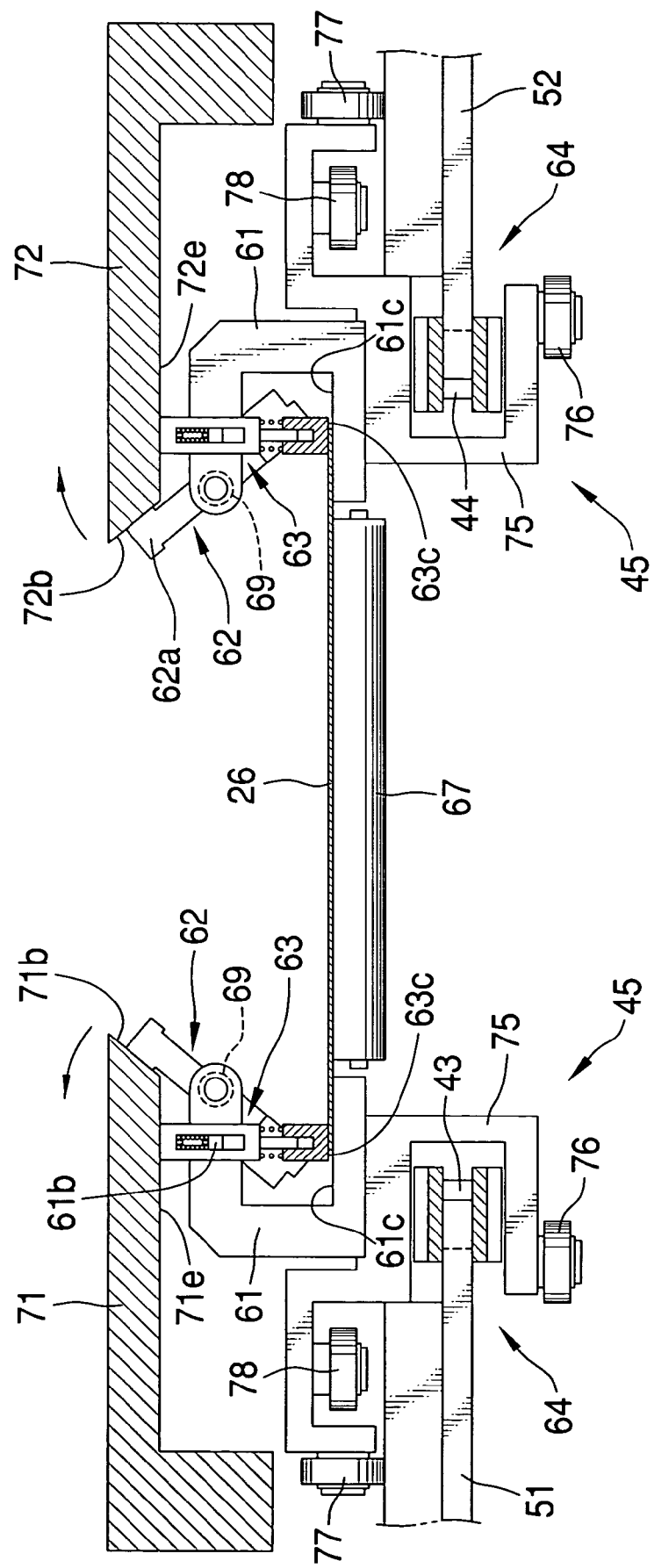
FIG. 4 is a side view of the clips in which the holding slider holds the lateral edge portion of the film.
Figure 5:
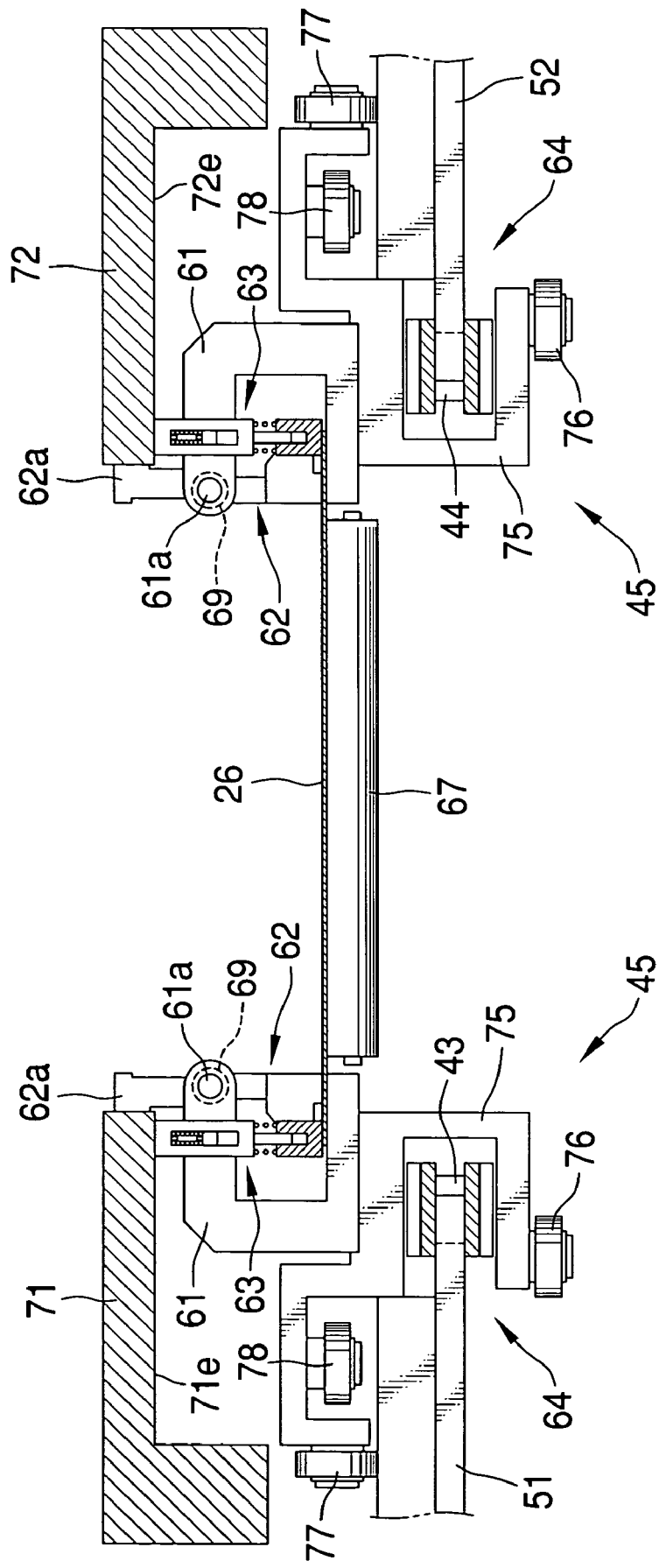
FIG. 5 is a side view of the clips in which a flapper holds the polymer film.
Figure 6:
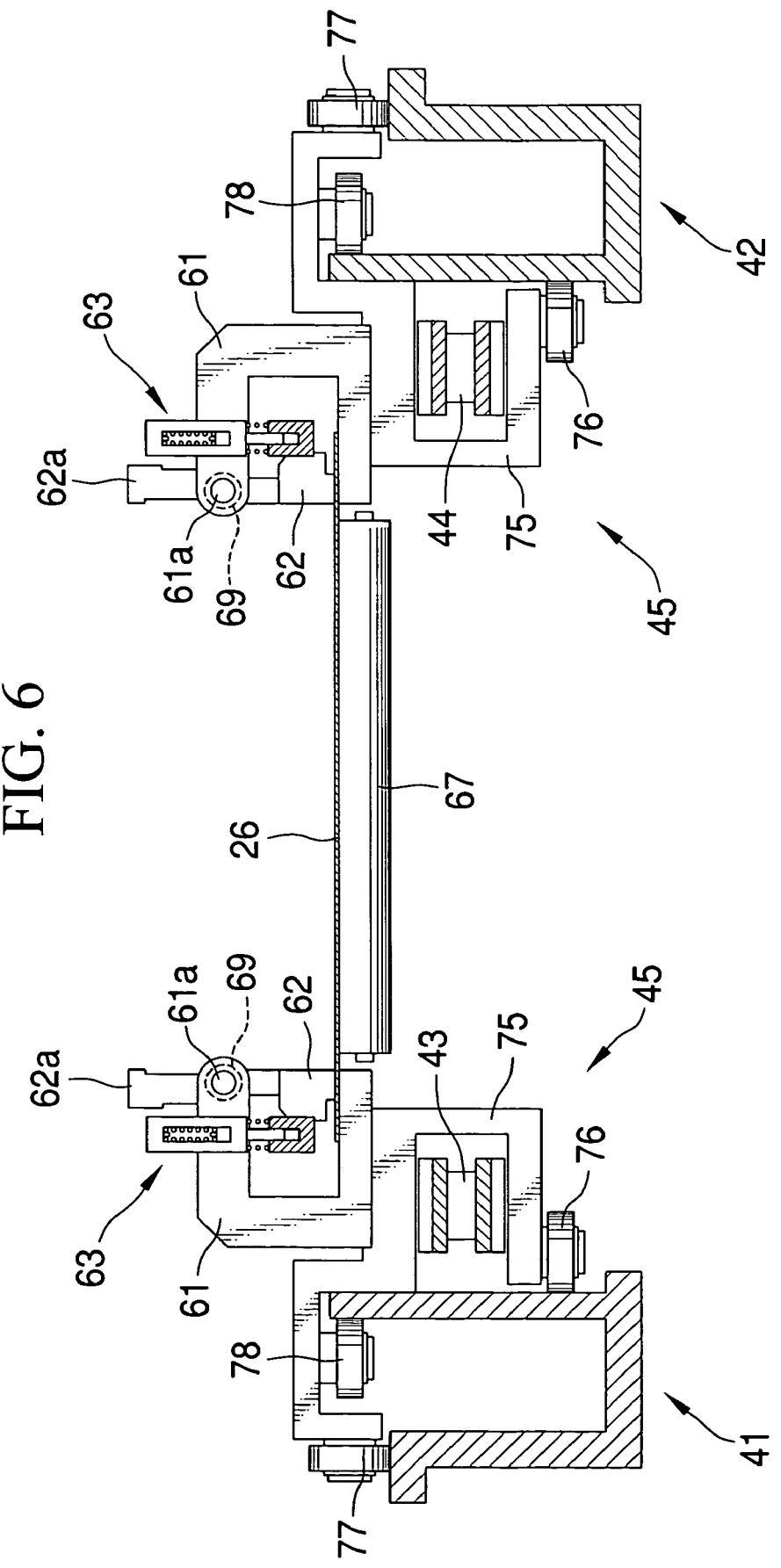
FIG. 6 is a side view of the clips in which the holding slider releases the lateral edge portion of the polymer film.

In FIG. 3, the holding slider 63 does not hold the lateral edge portion of the film 26. The holding slider 63 shown in FIG. 4 holds the lateral edge portion of the film 26. The flapper 62 shown in FIGS. 3 and 4 does not hold the film 26. In FIG. 5, the flapper 62 holds the film 26, and the flapper 62 shown in FIG. 6 releases the film 26.

The holding slider 63 is slidable between a release position (retracted position) and a hold position. At the release position, the holding portion 63b is slid upward by the coil spring 66 to release the film 26. At the hold position, the upper end 63d of the holding slider 63 is pressed by the entrance side film release members 71, 72, so the holding portion 63b is slid downward to press the lateral edge portions of the film 26. The flapper 62 is rotatable between a hold position and a release position (retracted position). The flapper 62 is held vertically at the hold position. At the release position, the top surface 62a of the flapper 62 is pressed by the entrance side film release member 71, 72 and the exit side film release member 73, 74. The flapper 62 is biased toward the hold position by its weight. Moreover, since a coil spring 69 as a flapper biasing member presses the flapper 62 toward the hold position, it is possible to ensure to set the flapper 62 at the hold position quickly. Even if the thermally damaged shaft 61a prevents the flapper 62 to rotate toward the hold position by its weight, the flapper 62 is stably set at the hold position by the coil spring 69. At the film hold position PA (see FIG. 2), the lateral portion of the film 26, inside the lateral edge portions thereof, is held by the film support surface 61c of the clip body 61 and the bottom surface 62 of the flapper 62. The feeding roller 67, driven by a motor (not illustrated), feeds the film 26 in the film feeding direction A1 toward the film hold position PA.

The rail mount 64 has a rail frame 75 and guide rollers 76, 77 and 78. The left chain 43 and the right chain 44 are mounted on the rail frame 75. The guide rollers 76-78 are rotated while coming in contact with the drive sprockets 51, 52 (see FIG. 3) or coming in contact with the rails 41, 42 (see FIG. 4). Thereby, the clips 45 are guided along the rails 41, 42 without coming off from the sprockets 51, 52 and the rails 41, 42.

Referring to FIGS. 2 and 3, near the tenter entrance 56, the entrance side film release members 71, 72 are provided with the left rail 41 and the right rail 42, respectively. Near the tenter exit 57, the exit side film release members 73, 74 are provided with the left rail 41 and the right rail 42, respectively. These film release members 71-74 move the clip 45 to the release position in which the flapper 62 and the holding slider 63 are at the release positions.

Figure 7:
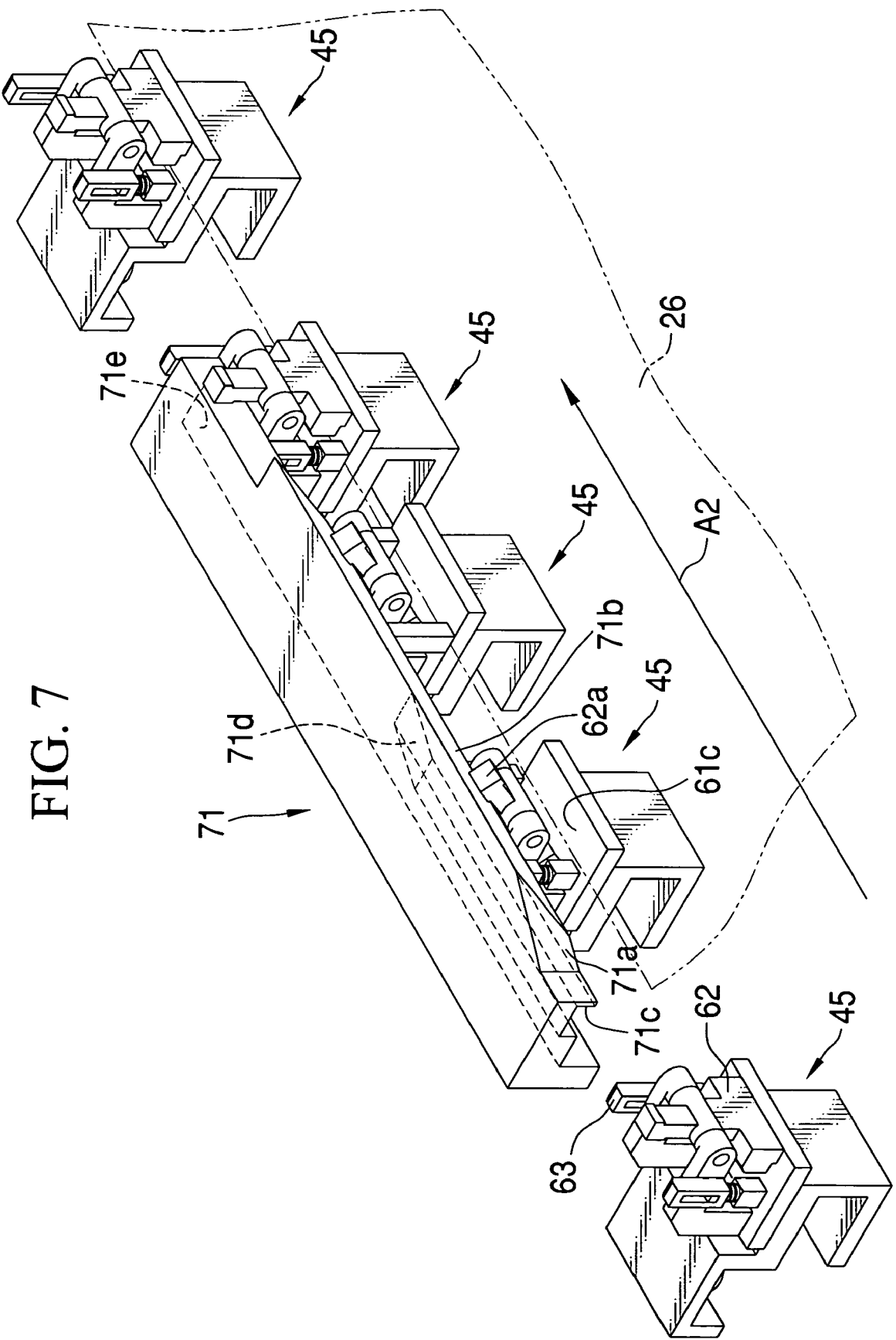
FIG. 7 is a perspective view of the clips that are held at a release position by an entrance regulation member.
Figure 8:
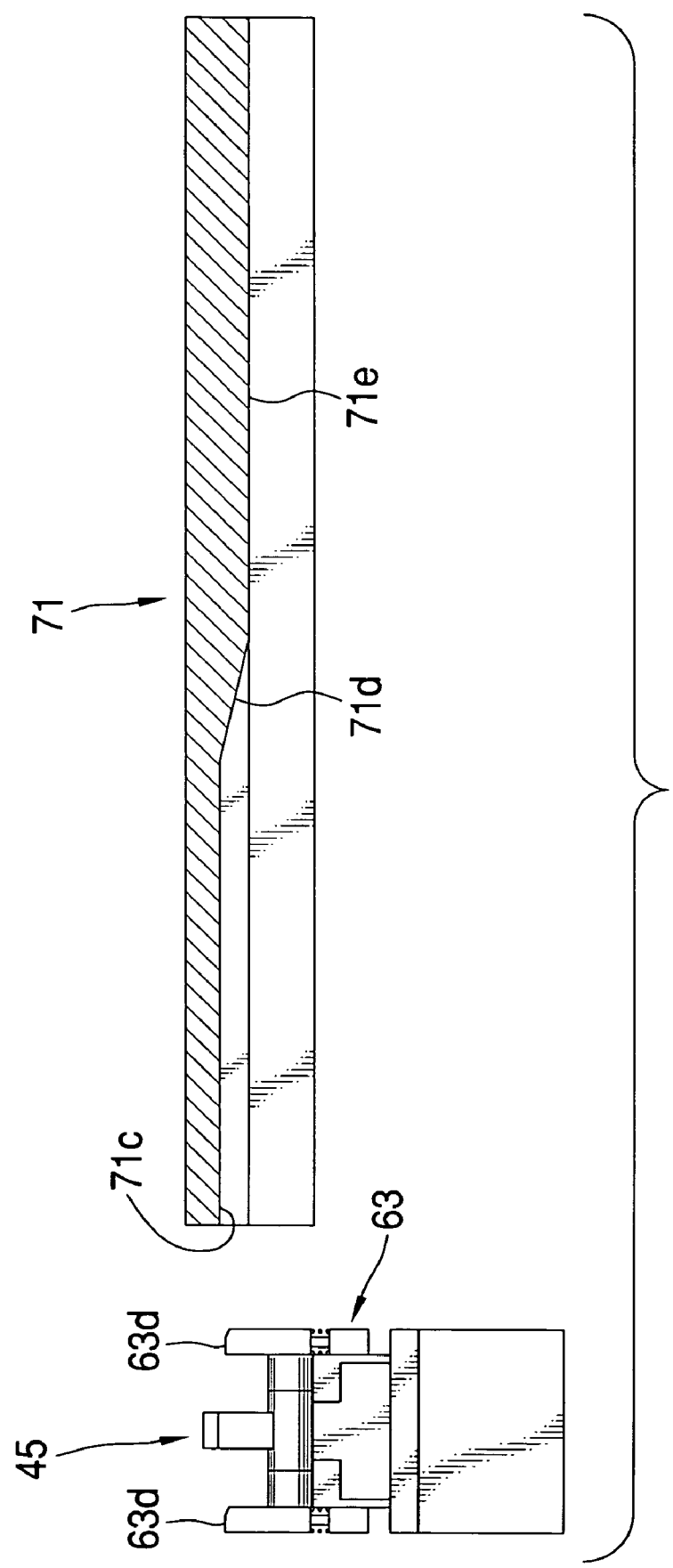
FIG. 8 is a sectional view of the entrance side film release member.

The entrance side film release members 71, 72 have the same structure, so the structure of the entrance side film release member 71 is described in this embodiment. Referring to FIGS. 7 and 8, the entrance side film release member 71 comprises a first tapered portion 71a, a flapper release portion 71b, a guide hollow 71c, a second tapered portion 71d and a press portion 71e. The first tapered portion 71a comes in contact with the head portion 62a of the flapper 62 and guides the flapper 62 toward the flapper release portion 71b. The flapper release portion 71b presses the flapper 62 to the release position to release the film 26. The guide hollow 71c guides the slide portion 63a of the holding slider 63, and the second tapered portion 71d comes in contact with the head portion 63d to shift the holding slider 63 to the hold position. The press portion 71e to press the holding portion 63b is longer in the clip movement direction A2 than the flapper release portion 71b, and thereby, the holding slider 63 releases the film 26 after the flapper 62 holds the film 26.

Figure 9:
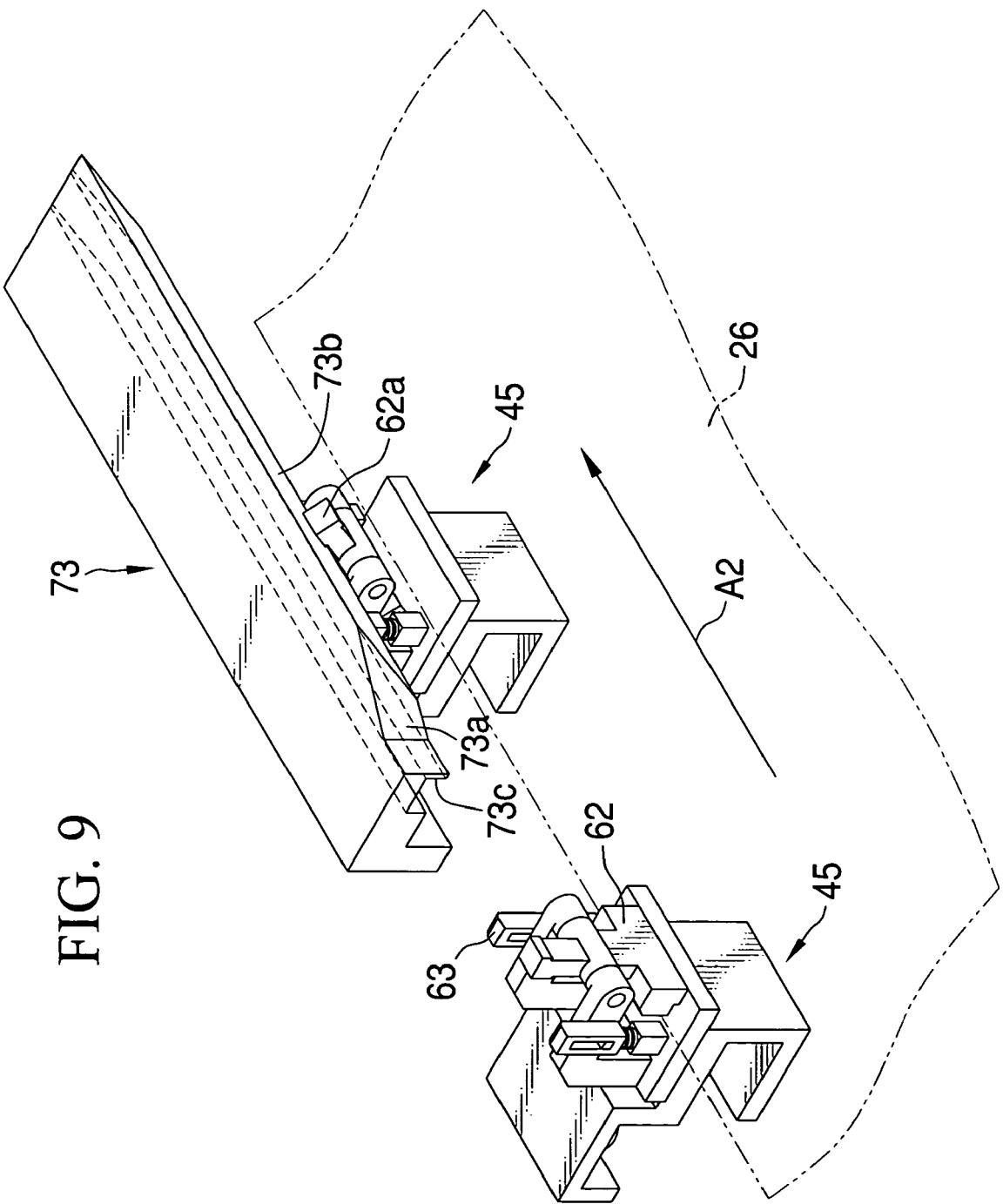
FIG. 9 is a perspective view of the clips that are held at a release position by an exit side film release member.

The exit side film release members 73, 74 have the same structure, so the structure of the exit side film release member 73 is described in this embodiment. Referring to FIG. 9, the exit regulation member 73 comprises a tapered portion 73a to guide the head portion 62a of the flapper 62, a flapper release portion 73b to release the film 26 from the flapper 62, and a hollow portion 73c to pass the holding slider 63.

Before the clip 45 reaches the film hold position PA (see FIG. 2), the entrance side film release members 71, 72 presses the head portion 62a to set the flapper 62 at the release position so that the film 26 can enter the flapper 62. In addition, the entrance side film release members 71, 72 presses the head portion 63d to slide the holding slider downward so that the holding portion 63b presses the lateral edge portions of the film 26. The pressure of the holding portion 63b to press the film 26 can be changed by adjusting the strength of the coil spring 65. When the clip 45 passes the film hold position PA, the head portion 62a is released from the entrance regulation member 71, 72, and thus the flapper 62 is set at the hold position from the release position to hold the film 26. Thereafter, the head portion 63d of the holding slider 63 is away from the entrance side film release member 71, 72, so the holding slider 63 releases the film 26.

At the film release position PB (see FIG. 2), the exit side film release members 73, 74 presses the head portion 62a to set the flapper 62 at the release position. Thereby, the flapper 62 releases the film 26. For the purpose of reducing friction between the film release members 71-74 and the head portions 62a, 63d, the regulation members 71-74 are preferably formed from resin such as Nylon and Derlin.

As shown in FIG. 2, the entrance side film release members 71, 72 are connected with a position adjuster 80 to adjust the position of the entrance side film release members 71, 72 in the direction of the movement of the clips 45. Thereby, it is possible to adjust the timing to hold the film 26 by the holding slider 63 and the flapper 62.

The operation of the solution film-forming facility will be explained. Note that the solution film-forming facility to employ the film stretching apparatus is not limited to that illustrated in FIG. 1.

After the impurities in the dope 12 are removed by the filter device 15, the dope 12 is flowed at a predetermined flowing speed to the casting die 21. The casting die 21 casts the dope 12 to form a cast bead 23, and the cast bead 23 is gelled on the rotary drum 22 to form a gel layer 24. While the rotary drum 22 is rotated, the gel layer 24 is further gelled enough to support its weight. When the gel layer 24 reaches the peeling position, the peeling roller 25 peels the gel layer 24 off from the rotary drum 22, and the peeled film 26 is fed to the tenter apparatus 31 via the feeding section 30. In the tenter apparatus 31, the film 26 is fed by the feeding roller 67 to the film hold position PA.

The clip 45 at the tenter entrance 56 is set at the release position to allow the film 26 to enter the clip 45. At that time, the holding slider 63 is set at the release position by the coil spring 66. Thereafter, the head portion 63d of the holding slider 63 comes in contact with the second tapered portions 71d, 72d of the entrance side film release members 71, 72, so the holding slider 63 moves downward. When the head portion 63d of the holding slider 63 is contacted with the press portion 71e, 72e, the lateral edge portions of the film 26 is held between the film support surface 61c and the film press surface 63e of the holding slider 63.

After the holding slider 63 holds the film 26, the film 26 is fed to the film hold position PA. At the film hold position PA, the flapper 62 is rotated to the hold position from the release position to hold the film 26. At that time, the flapper 62 is set at the hold position by the coil spring 69. After the flapper 62 holds the film 26, the holding slider 63 is disengaged from the entrance side film release members 71, 72 so that the holding slider 63 is slid upward from the hold position to the release position.

While the clips 45 move along the rails 41, 42 by rotating the endless chains 43, 44, the film 26 is stretched. At the film release position PB, the exit side film release members 73, 74 move the flapper 62 to release the stretched film 26. Then, the film 26 is fed from the tenter exit 57 to the drying chamber 33. While the film 26 is suspended and fed by the rollers 34, the film 26 is dried. Thereafter, the film 26 is cooled down to the room temperature in the cooling chamber 35, and rolled by the winding machine to form the rolled film product.

According to the tenter apparatus 31, the press sliders 63 press the lateral edge portions of the film 26 and then the flappers 62 hold the lateral portions of the film 26. Thus, it is possible to ensure to hold the film 26 without causing failure in holding or breakage in film edge, even if the lateral edge portions are curled. Moreover, since the coil spring 69 as the flapper biasing member presses the flapper 62 toward the hold position, it is possible to set the flapper 62 at the hold position securely and quickly.

Although the flapper 62 as the second holding member holds the film 26 after the press slider 63 as the first holding member holds the film 26 according to this embodiment, the press slider 63 and the flapper 62 can hold the film 26 simultaneously.

The feeding speed to feed the film 26 in the tenter apparatus 31 is preferably 100% to 150% of the feeding speed by the rotary drum 22. Such feeding speed in the tenter apparatus 31 can stretch the film 26 in the film feeding direction A1 in the feeding section 30.

The width of the film 26 after stretching is preferably 1200 mm to 2000 mm, but the width of the film 26 may be more than 2000 mm. The tenter apparatus 31 according to the present invention is effective in producing the thin film 26 having the thickness of 15 μm to 100 μm.

In stretching the film 26 by the tenter apparatus 31, the volatile component of the film 26 is preferably 3 wt % to 300 wt %. In the tenter apparatus 31, it is preferable to stretch the film 26 by providing the temperature profile between 40° C. to 140° C.

As to the film to be formed according to the present invention, cellulose acylate film is preferable, and more preferably cellulose triacetate film. The film to be formed is not limited to them. Any kinds of polymers may be used as long as the polymer as the main component or the precursor thereof can be added to the solvent to prepare the dope. Examples of the polymers are polyesters such as polyethylene telephthalate and polyethylene-2,6-naphtalate, polyolefins such as polyethylene, polystyrene, polyvinyl chloride, polyvinylidene chloride, polycarbonate, polyamide and polyimide. In the event of using polyimide, the polyimide film is formed by casting the solution of polyamic acid, removing the solvent by heating and drying, and crosslink the precursor. When cellulose triacetate is used to form the polymer film, the cotton linter or the wood pulp may be used as the raw material. It is also possible to mix the cotton linter and the wood pulp to form the cellulose triacetate film.

Figure 10:
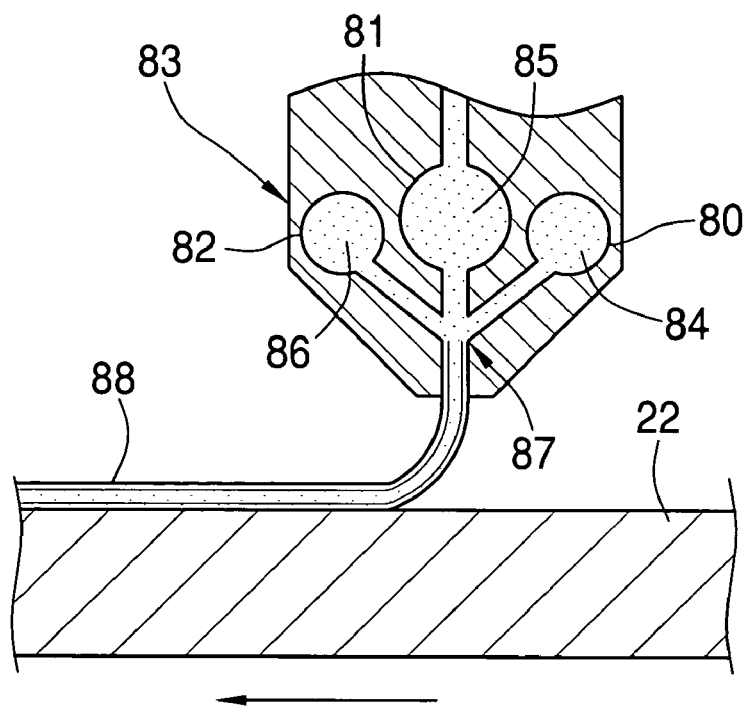
FIG. 10 is a partial cross section of an example of a co-casting die.
Figure 11:
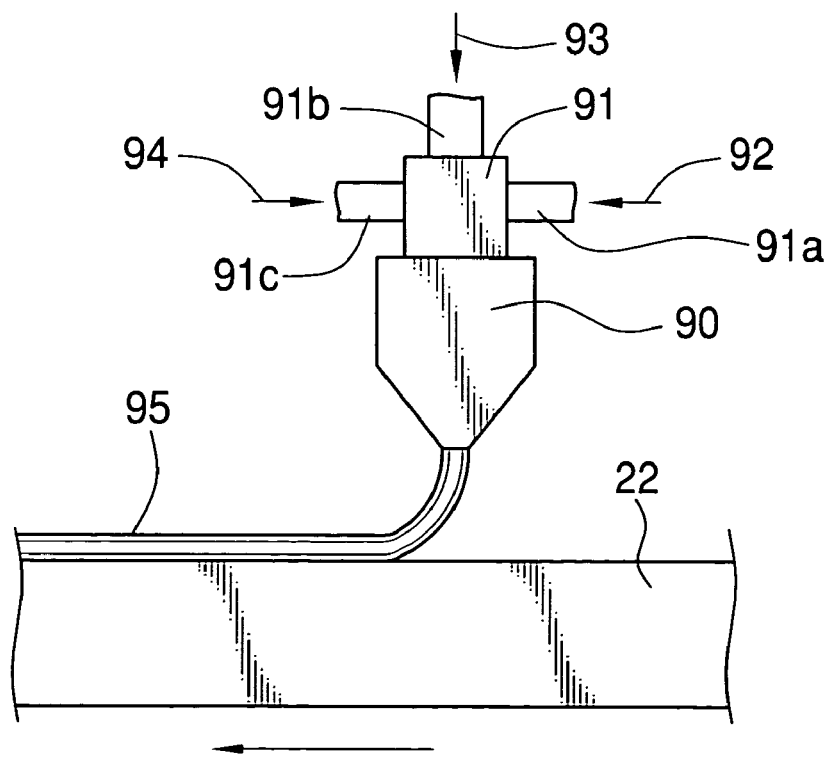
FIG. 11 is a front view of another example of the co-casting die.
Figure 12:
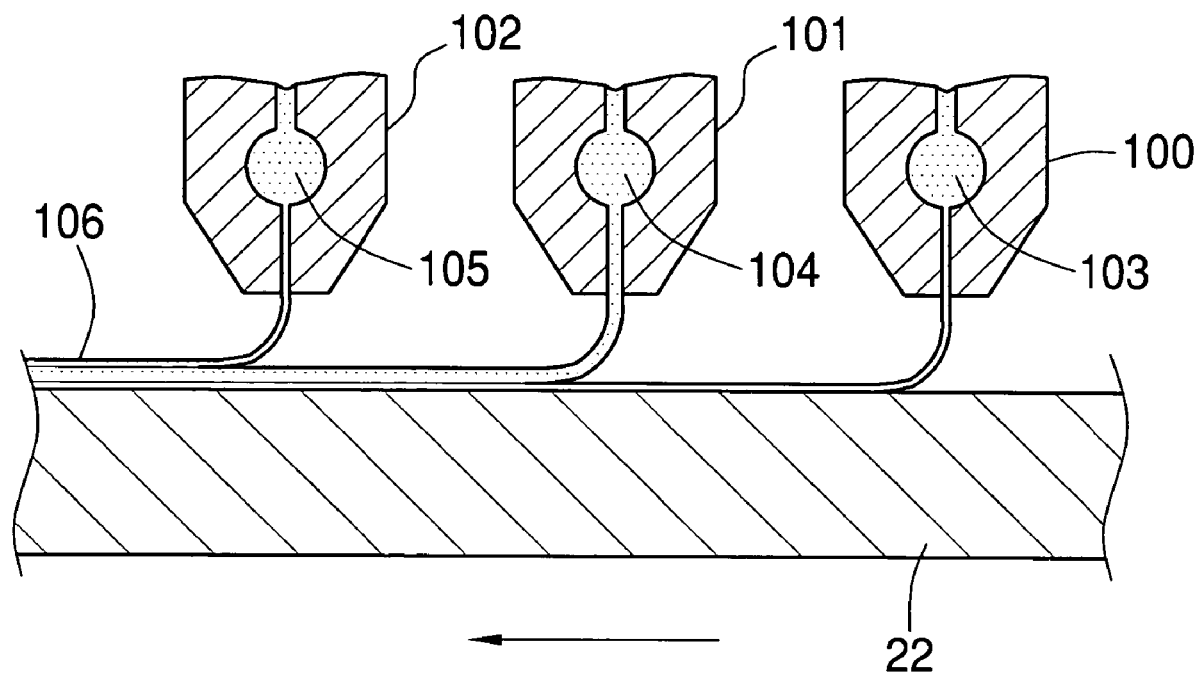
FIG. 12 is a partial cross section of an example of the casting dies of successive casting type.

The solution film-forming method according to the present invention can form a multi-layer film as well as a single layer film. The multi-layer film is formed by use of a co-casting die and successive casting dies. Examples of the co-casting die are depicted in FIGS. 10 and 11, and an example of the successive casting dies is depicted in FIG. 12. In FIGS. 10-12, same reference numerals are provided with the same structural parts as those shown in FIG. 1. In addition, the rotary drum 22 in FIGS. 10-12 is illustrated straight for the purpose of simplification.

In FIG. 10, a multi-manifold casting die 83 as the co-casting die comprises plural manifolds 80, 81, 82. Dopes 84, 85, 86 are contained in the manifolds 80-82, respectively. Note that the tubes to supply the dopes 84-86 are not illustrated in the drawing. The dopes 84-86 are joined at a junction 87. The casting die 83 casts the dopes 84-86 on the rotary drum 22 to form a cast layer 88. The film 26 is obtained by drying the cast layer 88.

In FIG. 11, another example of the co-casting die 90 is depicted. A feed block 91 is provided in the upstream side of the co-casting die 90. The dopes 92, 93, 94 are supplied from a dope supply device (not illustrated) through supply tubes 91a, 91b, 91c, respectively. After the dopes 92-94 are joined in the feed block 91, the co-casting die 90 casts the dopes 92-94 on the rotary drum 22 to form a cast layer 95. The film 26 is obtained by drying the cast layer 95 on the rotary drum 22.

Referring to FIG. 12, three casting dies 100, 101 and 102 to constitute the successive casting dies are arranged above the rotary drum 22. The dopes 103, 104, 105 are supplied from dope supply device (not illustrated) to the casting dies 100-102, respectively. Each of the casting dies 100-102 casts each of the dopes 103-105 on the rotary drum 22 to form a cast layer 106. The cast layer 106 on the rotary drum 22 is dried to form the film 26.

The film 26 as the film product is utilized as an optical film such as the protective film for the polarizing plate. The polarizing plate is formed by attaching the protective films on both front and rear surfaces of the polarizing film that is formed from polyvinyl alcohol. The film 26 is also utilized as an optical functional film. For instance, the optical compensation film is formed by attaching an optical compensation sheet on the film 26. In addition, an anti-reflection sheet can be produced by forming an anti-glare layer on the film 26. Since the surface condition of the film 26 is excellent, it is possible to produce a liquid crystal display device with excellent optical property by use of these film products.

The nonessential portion of the film-forming method according to the present invention is described in Japanese Patent Application No. 2003-319673, entitled "Cellulose Acylate Film and Solution Film-forming Method", filed on Sep. 11, 2003, and Japanese Patent Application No. 2003-319811, entitled "Cellulose Acylate Film, Solution Film-forming Method and Film Product", filed on Sep. 11, 2003, the details of which are herein incorporated by reference.

Figure 13:
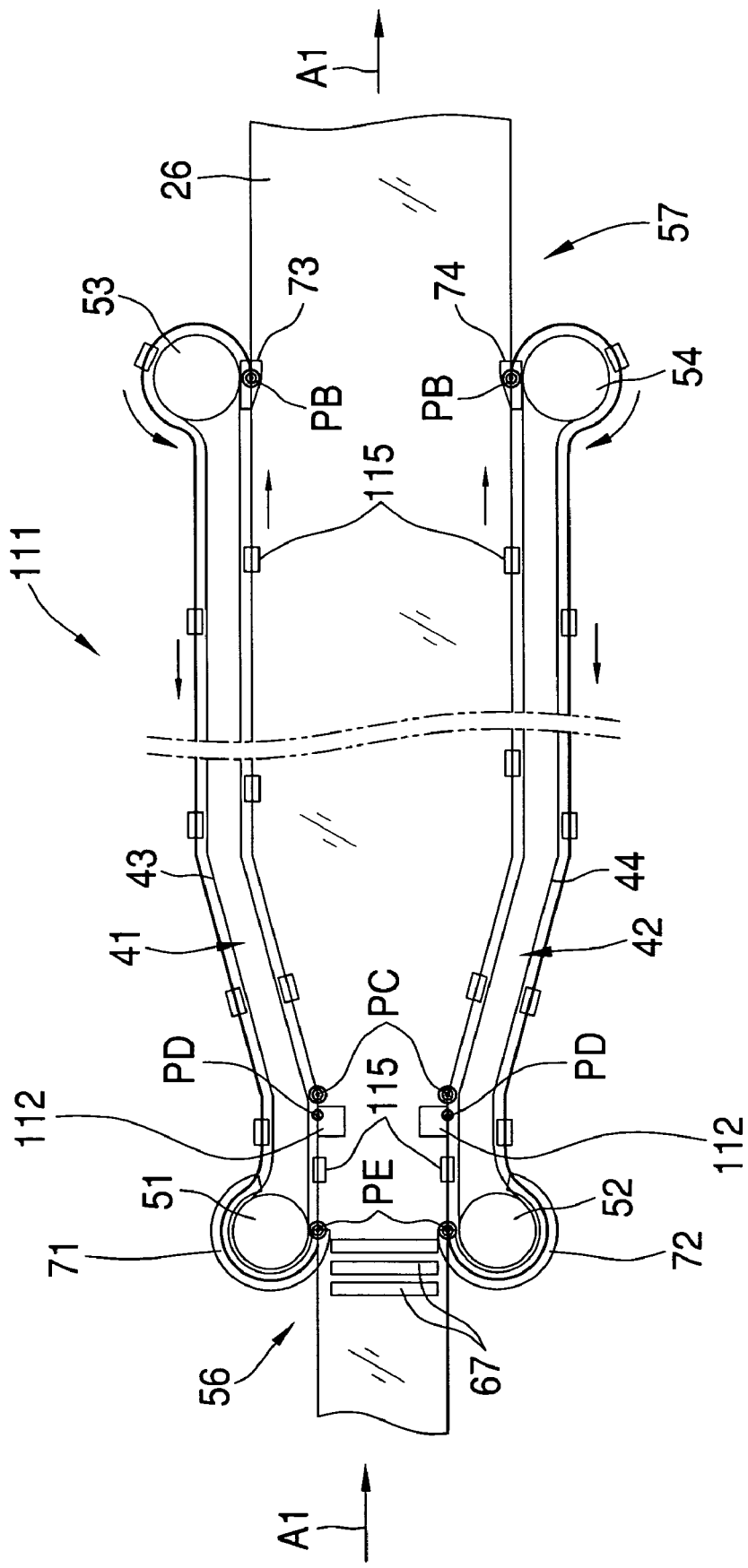
FIG. 13 is a top plan view of the tenter apparatus having clip closers and the clips that comprise flappers, holding levers and coil springs.

In FIGS. 13-19, the tenter apparatus 111 according to another embodiment is depicted. In FIGS. 13-19, same reference numerals are provided with the same structural parts as those in the above described embodiment to simplify the explanation. In FIG. 13, at the stretch start position PC, the tenter apparatus 111 starts to stretch the film 26 in the widthwise direction. The entrance side film release members 71, 72 have roughly round shape along the drive sprockets 51, 52.

Figure 19:
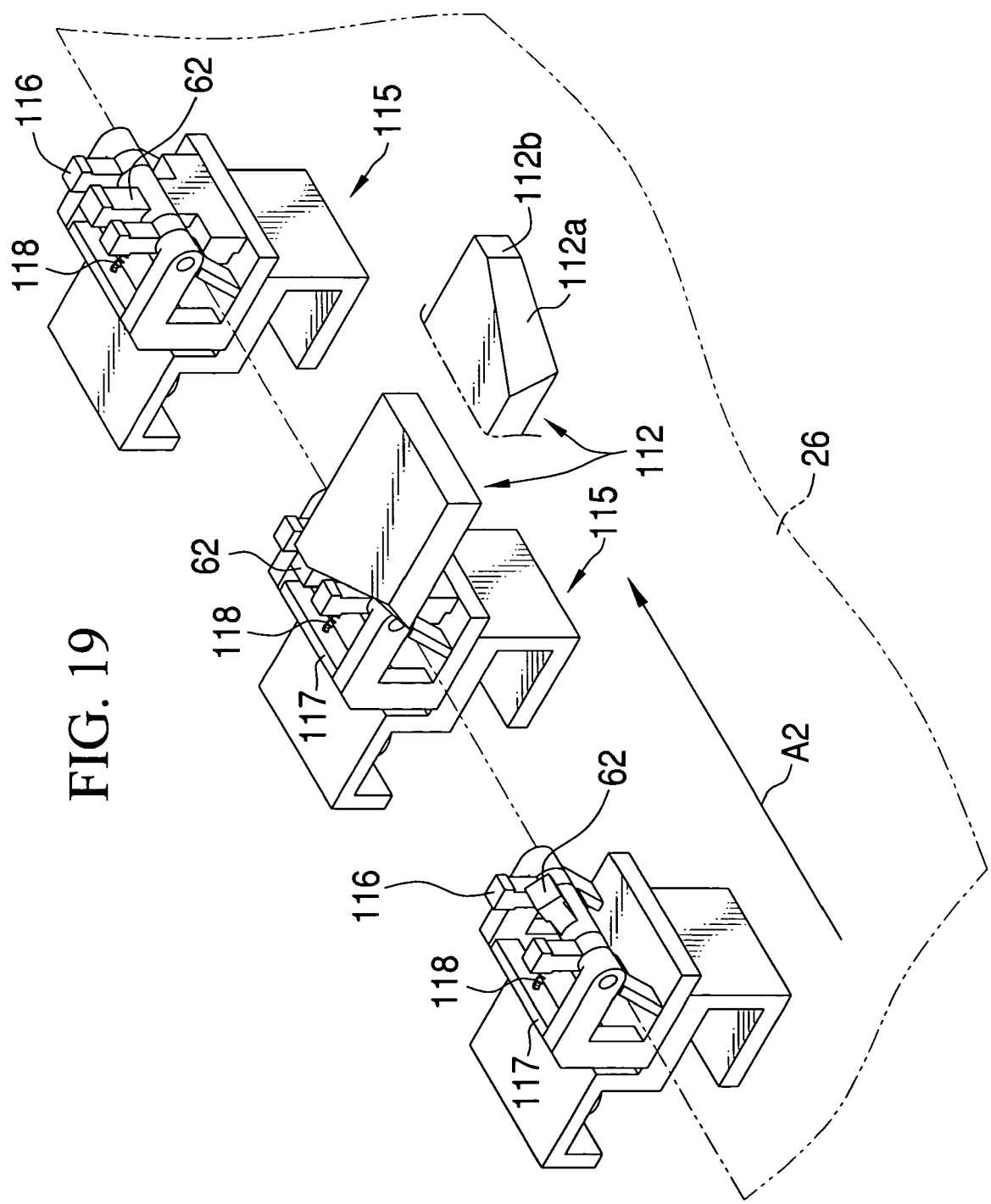
FIG. 19 is a perspective view of the clips in which an exit side film release member moves the flapper from a release position to a hold position.

A pair of clip closers 112 as the engaging members is provided at a flapper hold position PD upstream of the stretch start position PC with respect to the film feeding direction A1. In FIG. 19, each of the clip closers 112, located near the left and right rails 41, 42, has a tapered portion 112a and a hold portion 112b. The tapered portion 112a presses and guides the head portion 62a of the flapper 62, and the hold portion 112b keeps the flapper 62 at the hold position. The clip closer 112 is movable in the direction A2.

Figure 17:
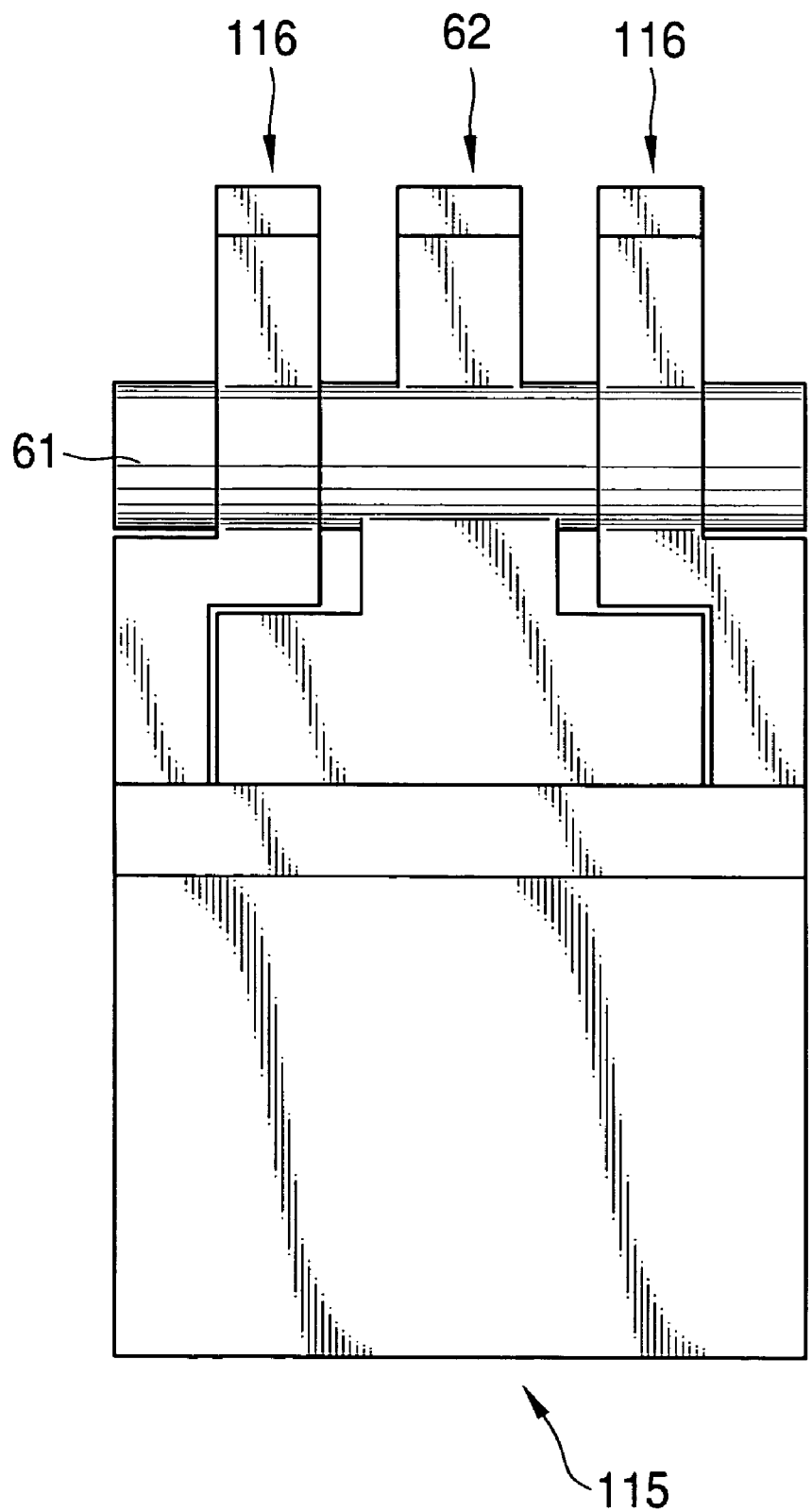
FIG. 17 is a side view of the flapper and the holding lever.
Figure 18:
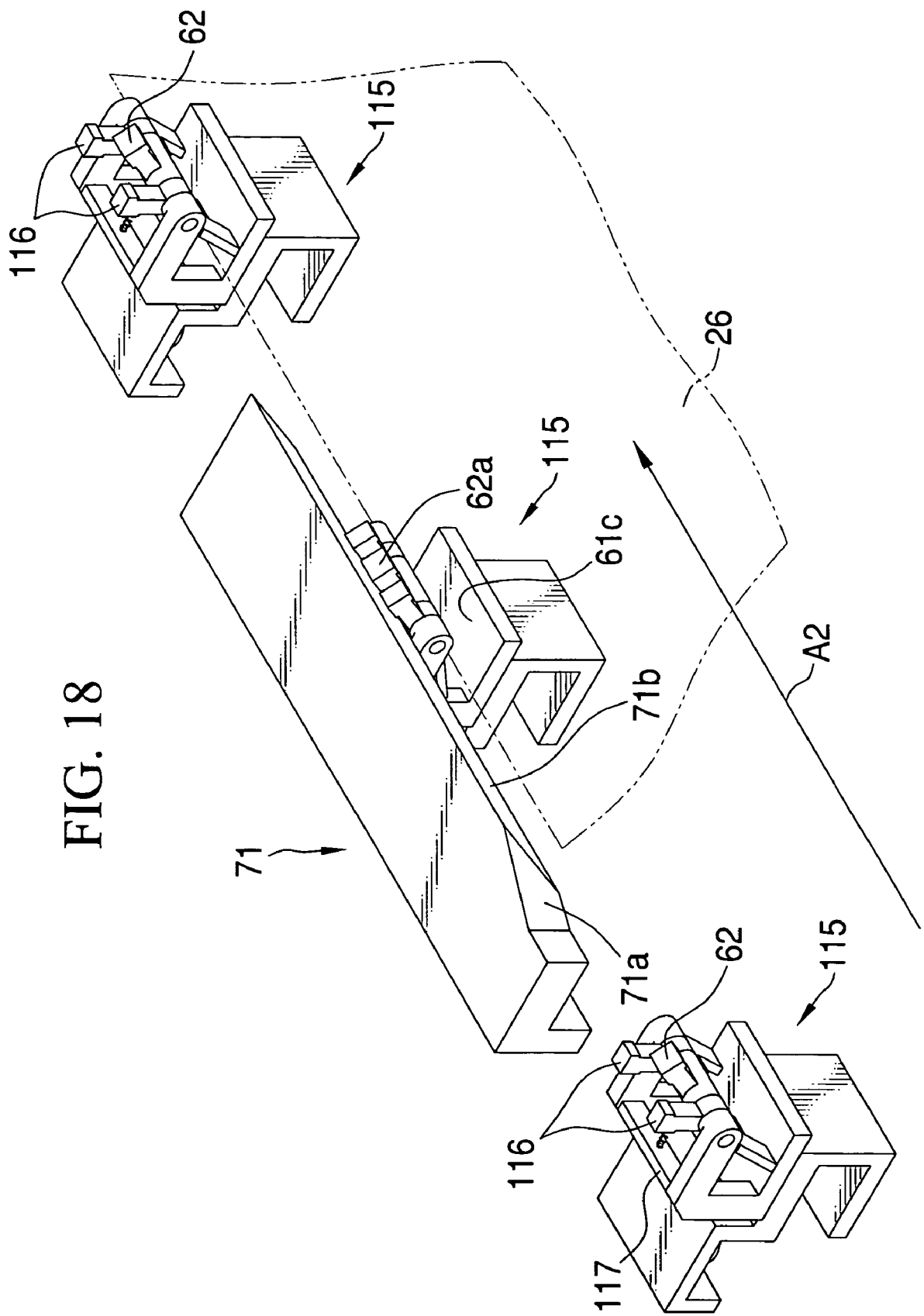
FIG. 18 is a perspective view of the clips that are at an release position by an entrance side film release member.

The clip 115 has a pair of holding levers 116 as the first holder (see FIGS. 17 and 18). The flapper 62 is provided between two holding levers 116. The holding lever 116, fitted into a shaft 61a of the clip body 61, is rotatable around the shaft 61a. The holding lever 116 is rotatable between a hold position to press the film 26 by its weight, and a release position to release the film 26. When the head portion 116a thereof is pressed by the tapered portion 71a, 72a and the release portion 71b, 72b of the entrance side film release members 71, 72, the holding lever 116 is rotated to the release position. The entrance side film release members 71, 72 in this embodiment serve as engaging member. The clip body 61 has a spring holder 117 in which a spring hook 117a is formed. A coil spring 118 is hooked between a spring hook 62c formed in the flapper 62 and the spring hook 117a formed in the spring holder 117. The coil spring 118 presses the flapper 62 in the direction in which the bottom surface 62b is away from the film support surface 61c.

Figure 14:
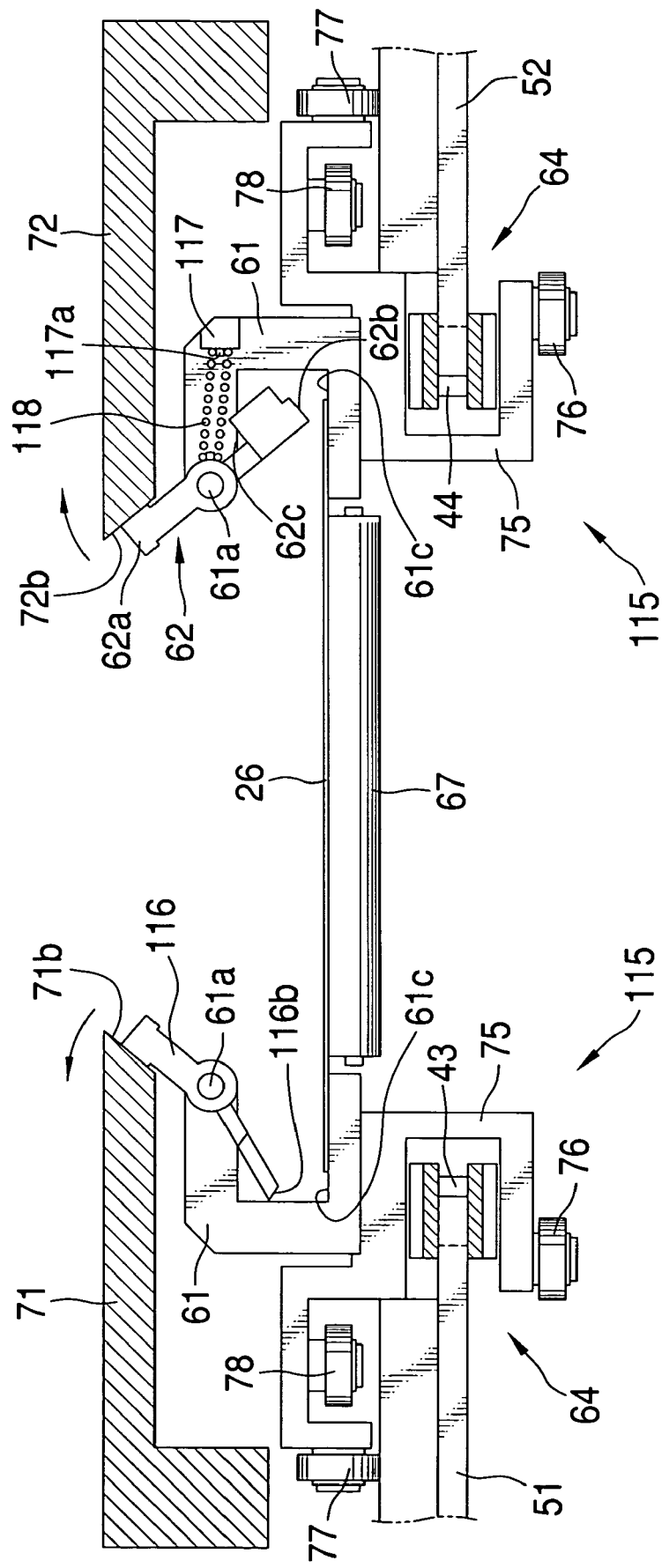
FIG. 14 is a side view of the clips before a holding lever holds the lateral edge portion of the film.
Figure 15:
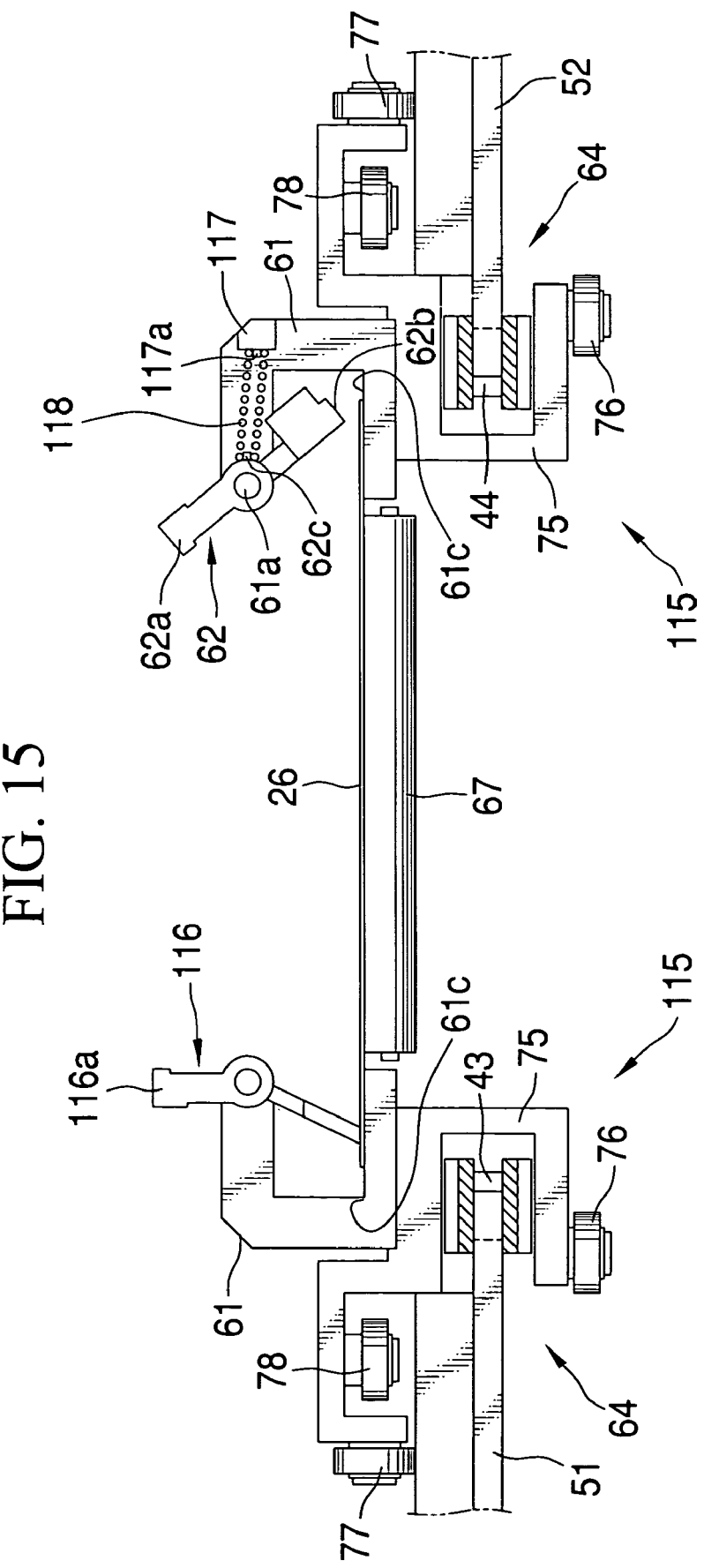
FIG. 15 is a side view similar to FIG. 14, in which the holding lever holds the lateral edge portion of the film.
Figure 16:
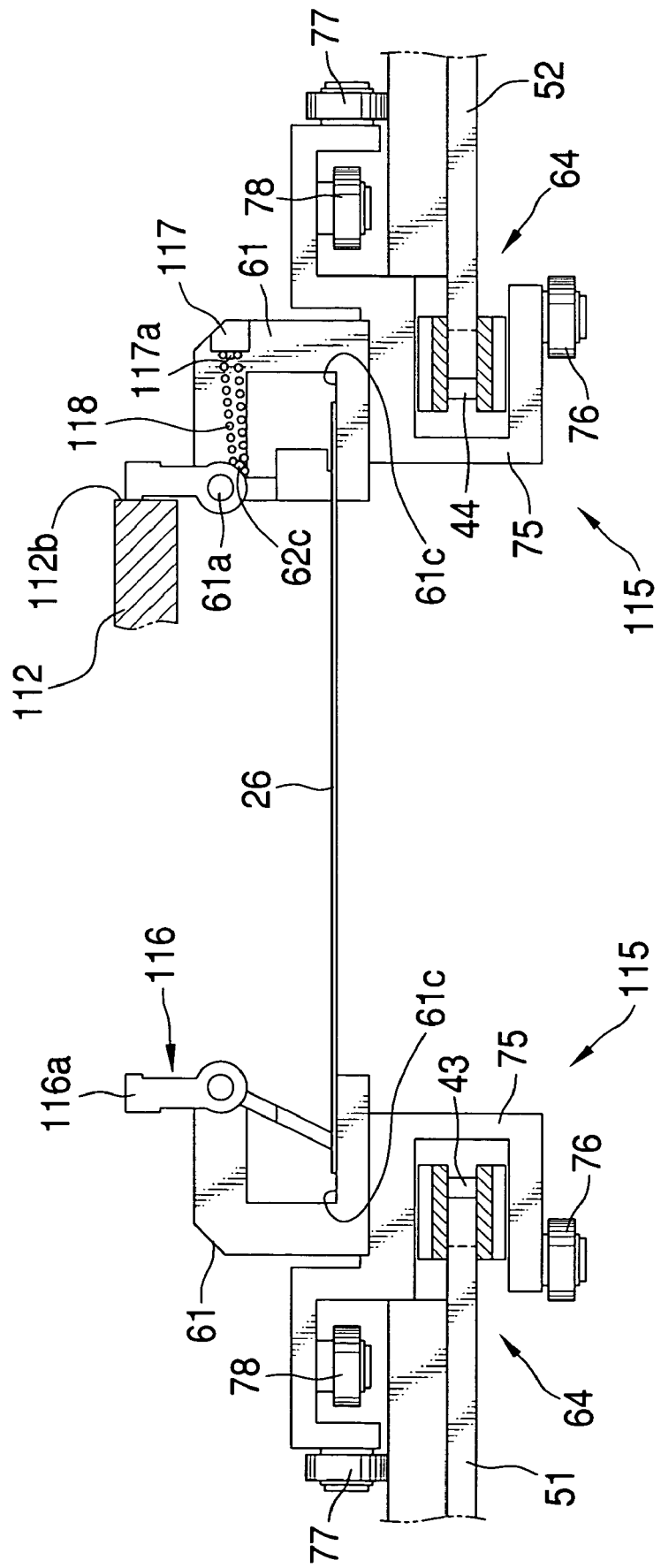
FIG. 16 is a side view of the clips in which a flapper holds the polymer film.

In FIG. 14, the holding lever 116 does not press the lateral edge portions of the film 26. The holding lever shown in FIG. 15 presses the lateral edge portions of the film 26. The flapper 62 shown in FIGS. 14 and 15 does not hold the film 26. In FIG. 16, the flapper 62 holds the film 26. In FIGS. 14-16, the holding lever 116 of the clip 115 is illustrated in the side of the endless chain 43 (left side), and the flapper 62 of the clip 115 is illustrated in the side of the other endless chain 44 (right side).

In FIG. 18, the entrance side film release member 71 is illustrated straight for the purpose of simplifying the drawing. In the tenter entrance 56, the flapper 62 is kept at the release position, and the entrance side film release member 71, 72 presses the holding lever 116 to the release position so that the film 26 can enter the clip 115. At the film hold position PE, the holding lever 116 is away from the entrance side film release member 71, 72 and rotates to the hold position to press the film 26 by its weight. Then, the lateral edge portions of the film 26 are pressed by the film support surface 61c and the film press surface 116b. Although the entrance regulation member 71, 72 does not press the flapper 62, the flapper 62 is kept at the release position by the coil spring 118.

Referring to FIG. 19, the film 26 is pressed by the holding lever 116 and fed to the flapper hold position PD. At the flapper hold position PD, the head portion 62a of the flapper 62 comes in contact with the tapered portion 112a of the clip closer 112. The flapper 62, guided by the tapered portion 112a, rotates to the hold position in which the flapper 62 comes in contact with the hold portion 112b of the clip closer 112. At the hold position, the coil spring 118 changes the direction to press the flapper 62 (see FIG. 16) so that the flapper 62 is kept at the hold position by the coil spring 118 even when the flapper 62 is away from the clip closer 112.

The holding lever 116 press the lateral edge portions of the film 26 between the film hold position PE to the flapper hold position PD, and the film 26 is held by the flapper 62 at the flapper hold position PD. Thereby, although the film 26 is soft and not dried completely, the film 26 is not torn when the flapper 62 holds the film 26. Moreover, since the clip closer 112 is movable in the clip movement direction A2, it is possible to adjust the position to hold the film 26 in accordance with the film type and various conditions.

Various changes and modifications are possible in the present invention and may be understood to be within the scope of the present invention.

Embodiment 1

In the solution film-forming facility 10 shown in FIG. 1, cellulose triacetate film is formed by use of the tenter apparatus 111 having the clips 115 shown in FIGS. 13-19. In producing the cellulose triacetate film, the co-casting die in FIG. 10 is used to cast the dope. The combinations of the materials for the dopes (A-type and B-type) are listed in Table 1. The A-type dope is used for the core layer of the cellulose triacetate film, and the B-type dope is used for the front and rear surface layers to sandwich the core layer. The dope casting speed is controlled such that the thickness of the film product (cellulose triacetate film) is 40 µm after stretching by the tenter apparatus 111. The film forming speed is 70 m/min, and the film peeling speed (film speed by the rotary drum 22) is 58 m/min. In the tenter apparatus 111, the film 26 is stretched by 1.2 times in the film feeding direction, and 1.5 times in the widthwise direction that is perpendicular to the film feeding direction. Note that the kinds and the proportion of the solvent are dichloromethane/methanol/buthanol=80/19.2/0.8. The thickness of the front, core and rear layers of the film 26 is 4/32/4 (µm).

TABLE 1

| Polymer solution type | A-type | B-type |
| --- | --- | --- |
| (Polymer) Cellulose triacetate (wt %) | 20 | 15 |
| Solvent (wt %) | 80 | 85 |
| Plasticizer (weight ratio to polymer) (wt %) | 12 | 8 |
| Ultraviolet ray absorbent (wt %) | 1 | 0.1 |
| Hydrophobic agent (wt %) | 0.001 | 0.02 |
| $SiO_2$ (weight ratio to polymer) (wt %) | 0.001 | 0.02 |

The film 26 through the feeding section 30 is regulated its width and dried in the tenter apparatus 111. Then, after being dried in the drying chamber 33, the film 26 is cooled down to the room temperature in the cooling chamber 35. The cooled film 26 is wound in the winding machine 36 to obtain the film product. The condition to hold the film by the clips 115 (Holding condition), the existence of film breakage after film stretching (Film breakage), the stability of the lateral edge portions of the film 26 in the post-process after film stretching (Lateral edge stability) are examined by eye inspection. After film winding process, it is examined by eye and camera inspections whether the lateral edge portions of the film 26 are folded and whether the film 26 has wrinkles. The results of the inspections are listed in Table 2. Note that, in the "Clip type" section, "N" indicates the clip with the holding lever 116, and "O" indicates the clip without the holding lever 116.

In the "Holding condition" section in Table 2, "Good" indicates that the clips 115 hold the film 26 properly, and "Not Good" indicates failure in holding by the clips 115. In the "Film breakage" section, "Good" indicates no breakage in film 26 after stretching, and "Not Good" indicates that breakage is found in the film 26 after film stretching. In the "Lateral edge stability" section, "Good" indicates that the lateral edge portions of the film 26 is stable in the post-process, and that "Not Good" indicates no good stability.

The film 26, produced in "Embodiment 1", has excellent surface condition without any bending in the lateral edge portions, wrinkles and puckering. The film 26 is properly held by the clips 115. In addition, there is no breakage in the film 26 after film stretching, and the lateral edge portions of the film 26 are stable during the post-process.

TABLE 2

| Title | Embodiment 1 | Comparison 1 | Comparison 2 | Comparison 3 |
| --- | --- | --- | --- | --- |
| Casting type | Co-casting | Co-casting | Co-casting | Co-casting |
| Surface layer | B-type | B-type | B-type | B-type |
| Core layer | A-type | A-type | A-type | A-type |
| Clip type | N | O | N | O |
| Casting speed | 70 m/min | 70 m/min | 70 m/min | 40 m/min |
| Thickness | 40 µm | 40 µm | 40 µm | 40 µm |
| Flapper spring | Y | Y | N | Y |
| Film holding condition | Good | Not Good | Not Good | Good |
| Film breakage | Good | Not Good | Not Good | Good |
| Film edge stability | Good | Not Good | Not Good | Not Good |

[Comparison 1]

In the solution film-forming facility 10 shown in FIG. 1, cellulose triacetate film is formed by use of the tenter apparatus 111 that does not have the holding lever 116. Other film-forming conditions are the same as Embodiment 1.

According to this comparative embodiment, since the tenter apparatus 111 does not have the holding lever, the flapper 62 holds the film 26 that is soft and not properly dried. Thus, it is found that the clips 115 fail to hold the film 26 and that the film 26 after stretching is broken. The film 26 in the post-process shows poor stability.

[Comparison 2]

In the solution film-forming facility 10 shown in FIG. 1, cellulose triacetate film is formed by use of the tenter apparatus 111 without the coil spring 118. Other film-forming conditions are the same as Embodiment 1.

In this comparative embodiment, the flapper 62 holds the film 26 holds the film 26 weakly because of no coil spring. Thus, the clips 115 fail to hold the film 26 and the film 26 after stretching is found to be broken. The film 26 in the post process is not stable.

[Comparison 3]

In the solution film-forming facility 10 shown in FIG. 1, cellulose triacetate film is formed by use of the tenter apparatus 111 without the holding lever 116. The film-forming speed is 40 m/min. Other film-forming conditions are the same as Embodiment 1.

Because the film-forming speed in this comparative embodiment is slower than Embodiment 1 and Comparison 1, 2, the clip 115 holds the film 26 properly, and the film 26 after stretching is not broken. Since the tenter apparatus 111 without the holding lever 116 can not press the lateral edge portions of the film 26, the lateral edge portions of the film 26 becomes curly so that the film 26 in the post process has poor stability.

In Embodiment 1 that employs the tenter apparatus according to the present invention, the film 26 is held and fed properly, and the obtained film 26 has excellent surface condition without lateral edge bending, precursor and wrinkles. The film 26 obtained in Embodiment 1 shows excellent result in film holding by the clips 115, existence in film breakage after stretching, and lateral edge stability in the post process.

Embodiment 2

In the solution film-forming facility 10 shown in FIG. 1, cellulose triacetate film is formed by use of the tenter apparatus 31 having the clips 45 shown in FIGS. 2-9. Other film-forming conditions are the same as Embodiment 1. The results of the film inspection are the same as Embodiment 1.

What is claimed is:

1. A solution film-forming method for forming a polymer film by casting polymer solution on a support, peeling the polymer film off the support, and stretching the polymer film by a film stretching apparatus, the film stretching apparatus having plural clips, each clip having first and second holders, the clips being attached to a pair of endless members for holding both lateral portions of the polymer film, the film stretching apparatus stretching the polymer film in the direction that crosses a film feeding direction while driving the endless members to feed the polymer film in the film feeding direction, the method comprising:

driving the first holder of each clip to hold both lateral edge portions of the polymer film; and driving the second holder of each clip to hold lateral portions of the polymer film, the lateral portion being inside of the lateral edge portion.

2. The solution film-forming method according to claim 1, wherein the first holder holds the lateral edge portion of the polymer film before the second holder holds the lateral portion of the polymer film.

3. The solution film-forming method according to claim 2, wherein the first holder releases the polymer film after the second holder holds the lateral portion of the polymer film.

4. The solution film-forming method according to claim 1, wherein the film stretching direction is the widthwise direction of the film, the method further comprising:

setting the film feeding speed by the endless members within the range from 1.0 to 1.5 times of the film feeding speed by the support, thereby the polymer film from the support is stretched to the film feeding direction in the area upstream of the film extension apparatus.

5. The solution film-forming method according to claim 1, wherein the volatile component of the polymer film during extension is 3 wt % to 300 wt %.

6. The solution film-forming method according to claim 1, wherein the width of the polymer film after stretching is 1200 mm to 2000 mm.

7. The solution film-forming method according to claim 1, wherein the polymer film is a cellulose acylate film.

8. The solution film-forming method according to claim 1, wherein an additive to the polymer solution includes at least one of Rth control agent, ultraviolet ray absorbent, plasticizer, hydrophobic agent and matt agent.

9. The solution film-forming method according to claim 1, wherein the polymer film is a multi-layer film formed from more than one kind of polymer solution, the polymer solutions being cast on the support by co-casting or successive casting.

10. The solution film-forming method according to claim 9, wherein the volatile component of the multi-layer film during extension is 3 wt % to 300 wt %.

11. The solution film-forming method according to claim 9, wherein the multi-layer film is stretched with the temperature profile between 40° C. to 140° C.

* * * * *